(12) United States Patent
Gill

(10) Patent No.: US 6,493,835 B1
(45) Date of Patent: Dec. 10, 2002

(54) SYSTEM AND METHOD FOR DETECTING MEDIA AND TRANSPORT DEGRADATION DURING MULTICHANNEL RECORDING

(75) Inventor: Richard A. Gill, Arvada, CO (US)

(73) Assignee: Storage Technology Corporation, Louisville, CO (US)

(*) Notice: Subject to any disclaimer, the term of this patent is extended or adjusted under 35 U.S.C. 154(b) by 0 days.

(21) Appl. No.: 09/410,471

(22) Filed: Sep. 30, 1999

(51) Int. Cl.[7] .................................................. G06F 11/00
(52) U.S. Cl. .......................................... 714/42; 714/721
(58) Field of Search ............................ 714/42, 44, 47, 714/48, 54, 25, 27, 760, 771, 764, 43, 56, 721

(56) References Cited

U.S. PATENT DOCUMENTS

| | | |
|---|---|---|
| 4,205,324 A | 5/1980 | Patel |
| 4,549,295 A | 10/1985 | Purvis |
| 5,253,126 A | 10/1993 | Richmond |
| 5,255,272 A * | 10/1993 | Gill et al. .................. 371/40.3 |
| 5,357,380 A | 10/1994 | Bailey et al. |
| 5,359,606 A * | 10/1994 | Lekmine et al. ................ 371/6 |
| 5,369,652 A | 11/1994 | Bailey et al. |
| 5,428,630 A * | 6/1995 | Weng et al. ................ 371/40.1 |
| 5,467,360 A | 11/1995 | Lokhoff |
| 6,035,425 A * | 3/2000 | Caldwell et al. .............. 714/52 |
| 6,263,469 B1 * | 7/2001 | Jang ............................ 714/775 |
| 6,308,298 B1 * | 10/2001 | Blatchley et al. ........... 714/775 |

FOREIGN PATENT DOCUMENTS

| | | |
|---|---|---|
| JP | 58 118023 | 7/1983 |
| JP | 01 149268 | 6/1989 |
| JP | 08 069671 | 3/1996 |
| WO | 00 30108 | 5/2000 |

\* cited by examiner

*Primary Examiner*—Nadeem Iqbal
(74) *Attorney, Agent, or Firm*—Brooks & Kushman P.C.

(57) ABSTRACT

A method and system for determining degradation of the tape drive and the tape in a multichannel recording system provides refined definition of correction for data recording statistics. The method and system generate a count signal indicative of the number of data blocks read from multi-track tape having more than a predetermined threshold of data bytes in error. The method and system generate a degradation signal indicative of tape drive and tape degradation if the ratio of corrected data blocks versus the total number of data blocks read from the tape is above a predetermined ratio. The degradation signal is indicative of tape drive degradation if the ratio of data blocks having more than the predetermined number of error data bytes along a single track versus the total number of data blocks read from the tape is above a predetermined ratio. The degradation signal is indicative of tape degradation if the ratio of data blocks having more than the predetermined number of tracks for a given data byte being in error versus total number of data blocks read from the tape is above a predetermined ratio.

7 Claims, 3 Drawing Sheets

SYSTEM AND METHOD FOR DETECTING MEDIA AND TRANSPORT DEGRADATION DURING MULTICHANNEL RECORDING

TECHNICAL FIELD

The present invention relates generally to multichannel data processing systems and, more particularly, to a method and system for detecting magnetic media and media transport degradation during multichannel recording.

BACKGROUND ART

Multichannel tape recording involves the writing and reading of data on more than one track on magnetic tape simultaneously. In the data processing industry, tape devices operate almost exclusively in the multichannel or multi-track environment. Multichannel recording and reading provide a high data transfer rate characterized by high tape speeds, high tape capacities, and decreasing tape thickness.

A tape drive writes data to and reads data from tape. Tape drive controllers generate data recording statistics regarding the quantities of data correction during writing and reading. The tape drive controllers provide the data recording statistics to an attached host computer. Software programs residing at the host computer process the data recording statistics to identify bad tape and/or malfunctioning tape drives. When data is written to and read from tape, the controller typically maintains a tally of various anomalous events that occur during writing (recording) and reading (reproducing). These events are typically categorized by severity and reported separately to the attached host computer for post processing.

The most severe error is a permanent error meaning that the operation that was intended to occur did not occur. The second type of error is a defect and occurs only during recording. A defect indicates that following multiple attempts of the initial recording operation, the data had to be written to another location on the tape for the intended recording operation to be completed. The third type of error is a temporary error. A temporary error indicates that multiple attempts were required for the intended recording or reading operation to be completed. Temporary errors generally indicate debris build up on the head of the tape drive. The debris build up initially causes the recording and reading errors. Multiple attempts of the intended operation cause the debris to break loose allowing the intended operation to be completed successfully. The last type of error is a correction. A correction indicates that the data block being written or read requires some amount of data correcting to correct the error using the embedded error correction code (ECC).

In the past, the quantity of data correction was expected to be low because of the relatively low tape densities. Any elevation in correction counts indicated that error margins were being reduced as more of the ECC was required to make the necessary corrections. Software programs for processing the data recording statistics flag tape for replacement and tape drives for maintenance depending on the data recording statistics. Today, the quantity of corrections is increasing as higher recording densities are being used. The quantity of corrections is increasing because narrower tape tracks are affected easily by asperities in the tape. In the past, asperities were too small to affect the wider tracks used in lower density tape. The increasing quantity of corrections cause high correction counts to be experienced during writing and reading. However, no real error margin has been lost and the ECC can easily handle the larger number of corrections. This causes the correction counts to become uninformative and less useful in determining degradation of tape and tape drives.

SUMMARY OF THE INVENTION

Accordingly, it is an object of the present invention to provide a method and system for providing a more refined definition of correction for data recording statistics.

It is another object of the present invention to provide a method and system for generating a count signal indicative of the number of data blocks read from multi-track tape having more than a predetermined threshold of data bytes in error.

It is a further object of the present invention to provide a method and system for generating a degradation signal indicative of tape drive and tape degradation if the data blocks having errors exceeding a predetermined threshold versus the total number of data blocks read from tape exceeds a predetermined ratio.

It is still another object of the present invention to provide a method and system for generating a degradation signal indicative of tape drive degradation when the ratio of data blocks having more than the predetermined number of error data bytes along a single track versus the total number of data blocks read from the tape is above a predetermined ratio.

It is still a further object of the present invention to provide a method and system for generating a tape degradation signal when the ratio of data blocks having more than a predetermined number of tracks for a given data byte in error versus the total number of data blocks read from the tape is above a predetermined ratio.

In carrying out the above objects and other objects, the present invention provides a method for use with a multichannel tape drive for reading data from a tape. The data is recorded on the tape in a plurality of data blocks. Each data block has a plurality of tracks and each track has the same number of data bytes. The method determines degradation of the tape drive and the tape. The method includes reading data blocks on the tape. A determination if more than a predetermined threshold of data bytes are in error for each data block is then made. An error data block count signal indicative of the number of data blocks having more than the predetermined threshold of data bytes being in error is then generated.

Preferably, each data block having more than the predetermined threshold of data bytes being in error is labeled as a corrected data block. The ratio of corrected data blocks versus the total number of data blocks read from the tape is then determined. A degradation signal indicative of degradation is then generated if the ratio of corrected data blocks versus the total number of data blocks read from the tape is above a predetermined ratio.

Preferably, determining if more than a predetermined threshold of data bytes are in error for each data block includes determining if more than a predetermined number of data bytes along a single track are in error for each data block. The degradation signal is then indicative of tape drive degradation if the ratio of data blocks having more than the predetermined number of data bytes along a single track being in error versus the total number of data blocks read from the tape is above a predetermined ratio.

Preferably, determining if more than a predetermined threshold of data bytes are in error for each data block includes determining if more than a predetermined number of tracks for a given data byte are in error for each data block. The degradation signal is then indicative of tape degradation if the ratio of data blocks having more than the predetermined number of tracks for a given data byte being in error versus the total number of data blocks read from the tape is above a predetermined ratio.

In carrying out the above objects and other objects, the present invention further provides a data processing system for determining tape and tape drive degradation in accordance with the method of the present invention. The system includes a multichannel tape drive for reading data blocks from a tape. Each data block has a plurality of tracks and each track has the same number of data bytes. The system further includes a tape drive controller for determining if more than a predetermined threshold of data bytes are in error for each data block. The tape drive controller generates an error data block count signal indicative of the number of data blocks having more than the predetermined threshold of data bytes being in error.

The advantages accruing to the present invention are numerous. The present invention filters out the data blocks that have an acceptable number of errors from the data blocks that have an unacceptable number of errors. This provides a more refined definition of data blocks having errors for statistical data storage analysis.

The above objects and other objects, features, and advantages embodiments of the present invention are readily apparent from the following detailed description of the best mode for carrying out the present invention when taken in connection with the accompanying drawings.

BEST MODES FOR CARRYING OUT THE INVENTION

Figure 1:
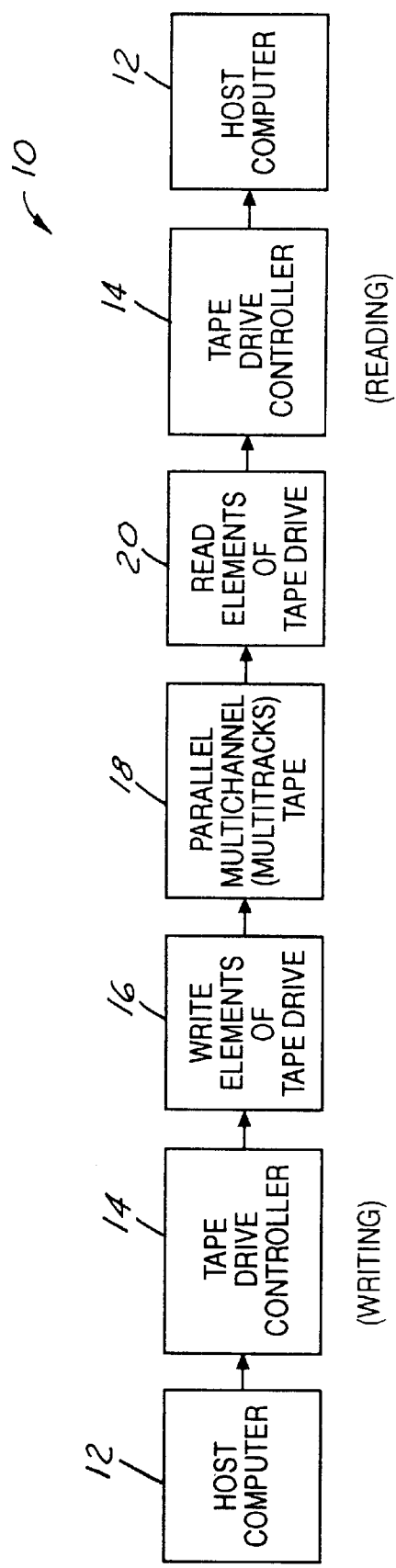
FIG. 1 illustrates a multichannel recording and reading system in accordance with the present invention.

Referring now to FIG. 1, a multichannel recording and reading system 10 in accordance with the present invention is shown. System 10 includes a host computer 12 connected to a tape drive controller 14. For writing data to tape 18 from host computer 12, controller 14 controls write elements 16 of a tape drive. Write elements 16 are arranged to simultaneously write data to parallel multiple tracks of tape 18 for multichannel recording. For reading data from tape 18 for host computer 12, controller 14 controls read elements 20 of the tape drive. Read elements 20 are arranged to simultaneously read data from parallel multiple tracks of tape 18 for multichannel reading. Prior to write elements 16 writing the data to tape 18, the data is interleaved and then error correction coding (ECC) is attached to the data. Similarly, after read elements 20 read the matrix interleaved data and the ECC from tape 18, the ECC is removed from the data and the data is then deinterleaved. The deinterleaved data is then provided to host computer 12.

Figure 2A:
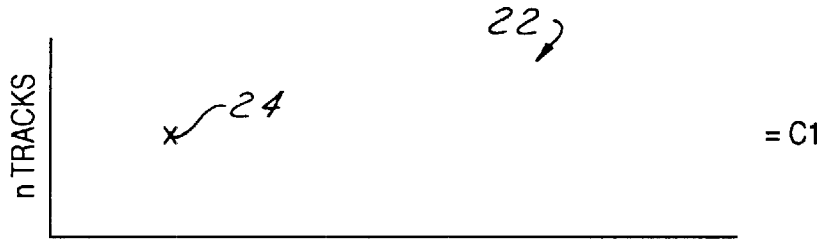
FIGS. 2A, 2B, 2C, and 2D illustrate data blocks having various types of correctable errors.

Referring now to FIG. 2A, a block 22 of data written to tape 18 is shown. Data block 22 is n parallel tracks wide by m bytes long. For instance, n=6. Thus, data block 22 includes n parallel tracks with each track having m bytes of data. Tape 18 includes a plurality of data blocks. Data block 22 has a correction 24 located at a given data byte on a given track. Correction 24 is present because the given data byte on the given track was in error. The ECC corrects the error to make correction 24. The ECC is able to make the correction because the error is limited to a single data byte on a single track. A correctable error for a data block that is limited to a predetermined number of data bytes (for instance, a single data byte) on a single track is referred to as a "C1" data block correction as shown in FIG. 2A. A C1 data block correction is indicative of a tape defect caused by asperities in the tape. Generally, it is not economical to make tape media having no defects and it is generally expected that tape will have some defects. C1 data block corrections are quite frequent and are the majority of all corrections on tape. C1 data block corrections are allowable if they are not excessive.

Figure 2B:
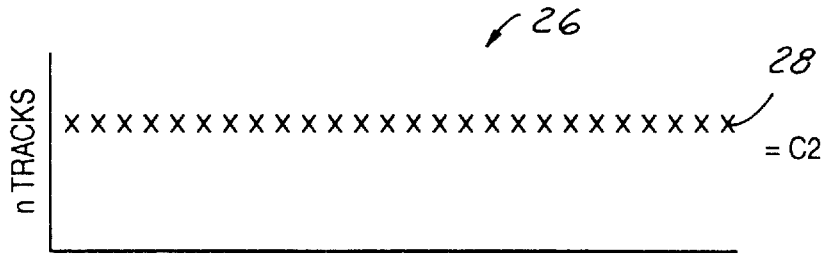

Referring now to FIG. 2B, a block 26 of data written to tape 18 is shown. Data block 26 has corrections 28 extending across all m data bytes of a single track. Corrections 28 are present because all of the m data bytes of the single track are in error. The ECC corrects the error to make correction 28. Corrections for a data block that are limited to a single track but extend across more than a predetermined number of data bytes (for instance, all of the data bytes of the single track) are referred to as a "C2" data block correction as shown in FIG. 2B. When recording and reading tape, excessive C2 data block corrections are not expected. Generally, a C2 data block correction is indicative of tape drive hardware problems. For example, a C2 data block correction is indicative of the read and write elements of the tape drive being clogged. In response to C2 data block corrections, a recovery action can be invoked to clean the read and write elements of the tape drive.

Figure 2C:
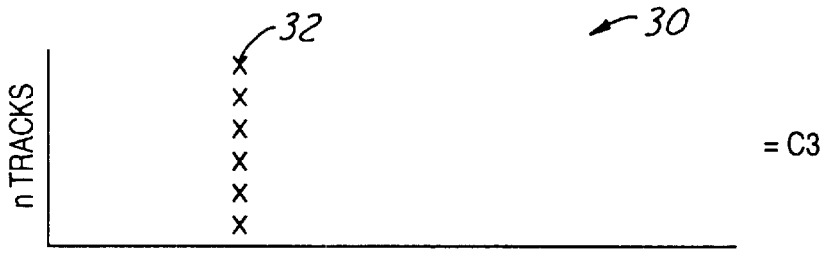

Referring now to FIG. 2C, a block 30 of data written to tape 18 is shown. Data block 30 has corrections 32 extending across all n tracks for a given data byte. Corrections 32 are present because all of the n tracks for a given data byte are in error. The ECC corrects the errors to make corrections 32. Corrections for a data block that are limited to a given data byte but extend across more than a predetermined number of tracks (for instance, all of the n tracks) are referred to as a "C3" data block correction as shown in FIG. 2C. When recording and reading tape, excessive quantities of C3 data block corrections are not expected. Generally, a C3 data block correction is indicative of large tape defects such as folds, scratches, debris, imprints, and the like. In response to C3 data block corrections, the tape can be replaced with a tape that does not have defects.

Figure 2D:
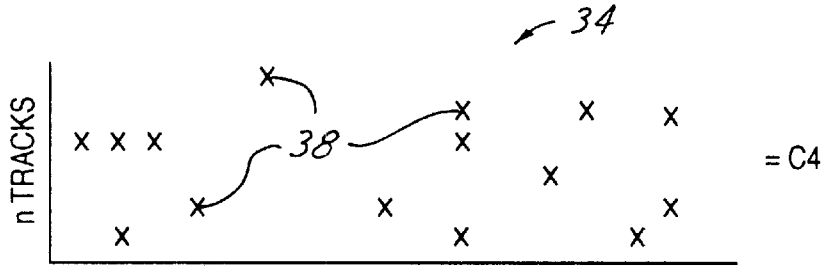

Referring now to FIG. 2D, a block 34 of data written to tape 18 is shown. Data block 34 has corrections 36 located on various tracks and bytes. Corrections 36 are present because there are multiple errors scattered throughout data block 34. If the errors are not too numerous, the ECC corrects the errors to make corrections 36. Corrections 36 for a data block that are scattered throughout the data block and are more than a predetermined number (for instance, more than two corrections) are referred to as a "C4" data block correction as shown in FIG. 2D. When recording and reading tape, excessive quantities of C4 data block corrections are not expected. A C4 data block correction is a real indicator of reduced recording and/or data retrieval capability. Generally, a C4 data block correction is indicative of marginal recording, worn tape, worn read and write elements, and the like. In response, to C4 data block corrections, the tape can be replaced and the tape drive can be cleaned and/or replaced.

Figure 3:
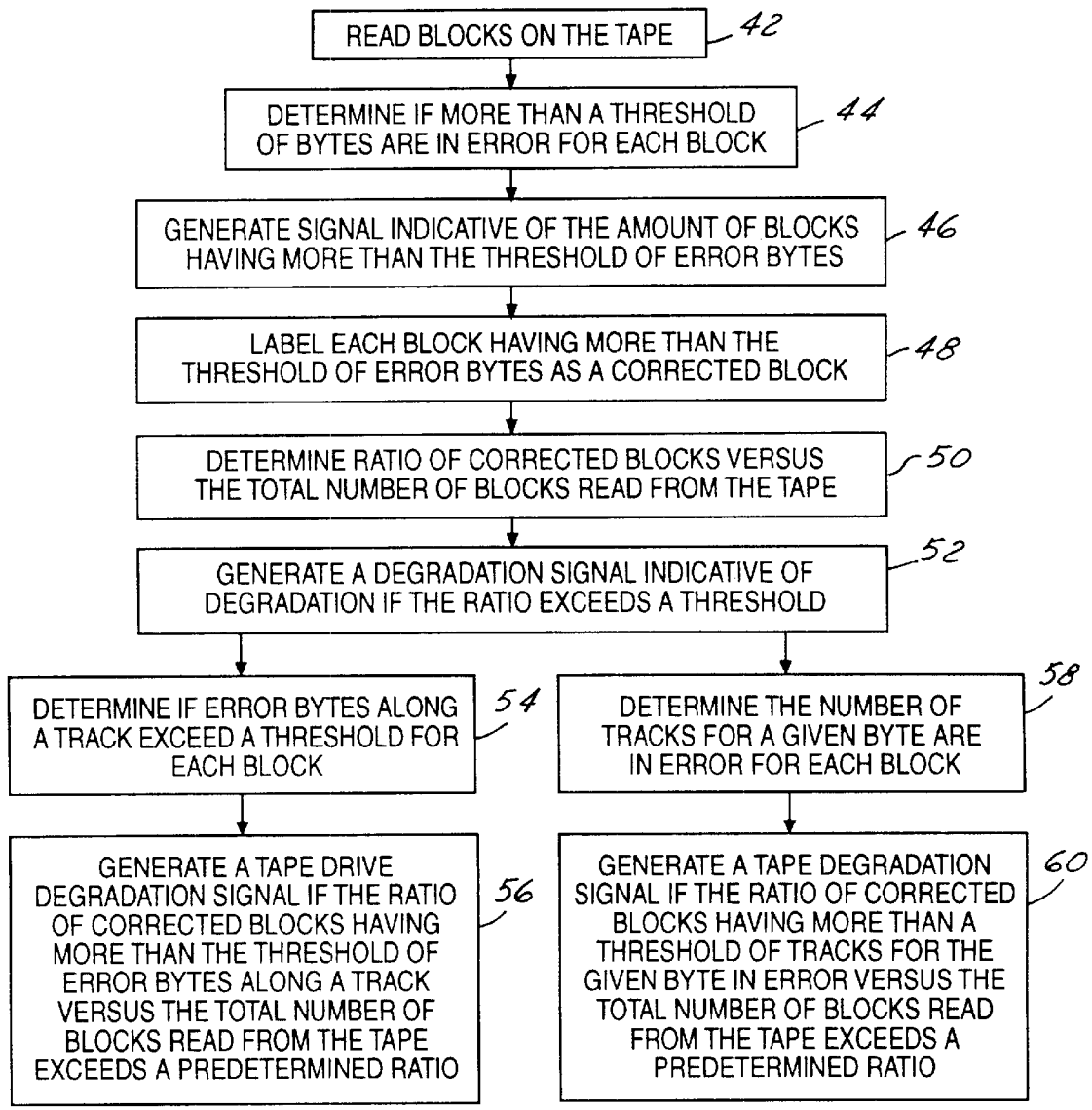
FIG. 3 illustrates a flow chart describing operation of the method and system of the present invention.

Referring now to FIG. 3, with continual reference to FIG. 1, a flow chart 40 illustrating operation of system 10 in accordance with the method of the present invention is shown. Flow chart 40 begins with read elements 20 of the tape drive reading data blocks on tape 18 as shown in box 42. Controller 14 then determines if more than a predetermined threshold of data bytes are in error for each data block as shown in box 44. Tape drive controller 14 then generates an error data block count signal indicative of the number of data blocks having more than the predetermined threshold of data bytes being in error as shown in box 46.

Controller 14 labels each data block having more than the predetermined threshold of data bytes being in error as a corrected data block as shown in box 48. Controller 14 then determines the ratio of corrected data blocks versus total number of data blocks read from the tape as shown in box 50. Controller 14 then generates a degradation signal indicative of degradation if the ratio of corrected data blocks versus the total number of data blocks read from the tape is above a predetermined ratio as shown in box 52.

Controller 14 also determines if more than a predetermined number of data bytes along a single track are in error for each data block as shown in box 54. If the ratio of corrected data blocks having more than the predetermined number of error data bytes along a single track versus the total number of data blocks read from the tape is above a predetermined ratio, then controller 14 generates a degradation signal indicative of tape drive degradation as shown in box 56.

Controller 14 further determines if more than a predetermined number of tracks for a given data byte are in error for each data block as shown in box 58. If the ratio of corrected data blocks having more than the predetermined number of tracks for a given data byte being in error versus the number of data blocks read from the tape is above a predetermined ratio, then controller 14 generates a degradation signal indicative of tape degradation as shown in box 60.

In addition to the count signal being indicative of the number of data blocks having more than a predetermined threshold of data bytes being in error, controller 14 is further operable to generate other types of count signals. For instance, controller 14 can generate a count signal indicative of the number of data blocks having more than a predetermined threshold of error data bytes along a single track. Controller 14 can further generate a count signal indicative of the number of data blocks having more than a predetermined number of tracks for a given data byte being in error.

Thus it is apparent that there has been provided, in accordance with the present invention, a method and system for determining tape and tape drive degradation that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. In a multichannel tape drive for reading data from a tape, wherein the data is recorded on the tape in a plurality of data blocks, each data block having a plurality of tracks and each track having the same number of data bytes, a method for determining degradation of the tape drive and the tape, the method comprising:

reading data blocks on the tape;

determining if more than a predetermined threshold of data bytes are in error for each data block;

generating an error data block count signal indicative of the number of data blocks having more than the predetermined threshold of data bytes being in error;

determining if more than a predetermined number of data bytes along a single track are in error for each data block;

generating a tape drive degradation signal indicative of the tape drive being degraded if the ratio of data blocks having more than the predetermined number of data bytes along a single track being in error versus the total number of data blocks read from the tape is above a predetermined ratio;

determining if more than a predetermined number of tracks for a given data byte are in error for each data block; and generating a tape degradation signal indicative of the tape being degraded if the ratio of data blocks having more than the predetermined number of tracks for a given data byte being in error versus the total number of data blocks read from the tape is above a predetermined ratio.

2. The method of claim 1 further comprising:

generating a degradation signal indicative of the tape drive and the tape being degraded if the ratio of the sum of the data blocks having more than the predetermined number of data bytes along a single track being in error and the data blocks having more than the predetermined number of tracks for a given data byte being in error versus the total number of data blocks read from the tape is above a predetermined ratio.

3. In a multichannel tape drive for reading data from a tape, wherein the data is recorded on the tape in a plurality of data blocks, each data block having a plurality of tracks and each track having the same number of data bytes, a method for determining degradation of the tape drive and the tape, the method comprising:

reading data blocks on the tape;

determining if more than a predetermined threshold of data bytes are in error for each data block;

labeling each data block having more than the predetermined threshold of data bytes being in error as a corrected data block;

determining ratio of corrected data blocks versus total number of data blocks read from the tape;

generating a degradation signal indicative of degradation if the ratio of corrected data blocks versus the total number of data blocks read from the tape is above a predetermined ratio;

determining if more than a predetermined number of data bytes along a single track are in error for each data block;

generating a tape drive degradation signal indicative of the tape drive being degraded if the ratio of data blocks having more than the predetermined number of data bytes along a single track being in error versus the total number of data blocks read from the tape is above a predetermined ratio;

determining if more than a predetermined number of tracks for a given data byte are in error for each data block; and generating a tape degradation signal indicative of the tape being degraded if the ratio of data blocks having more than the predetermined number of tracks for a given data byte being in error versus the total number of data blocks read from the tape is above a predetermined ratio.

4. The method of claim 3 further comprising:

generating a corrected data block signal indicative of the number of corrected data blocks.

5. The method of claim 3 further comprising:

generating a degradation signal indicative of the tape drive and the tape being degraded if the ratio of the sum of the data blocks having more than the predetermined number of data bytes along a single track being in error and the data blocks having more than the predetermined number of tracks for a given data byte being in error versus the total number of data blocks read from the tape is above a predetermined ratio.

6. A data processing system for determining tape and tape drive degradation, the system comprising:

a multichannel tape drive for reading data blocks from a tape, each data block having a plurality of tracks and each track having the same number of data bytes; and a tape drive controller for determining if more than a predetermined threshold of data bytes are in error for each data block, wherein the tape drive controller generates an error data block count signal indicative of the number of data blocks having more than the predetermined threshold of data bytes being in error;

wherein the tape drive controller determines if more than a predetermined number of data bytes along a single track are in error for each data block, wherein the tape drive controller generates a degradation signal indicative of the tape drive being degraded if the ratio of data blocks having more than the predetermined number of data bytes along a single track being in error versus the total number of data blocks read from the tape is above a predetermined ratio;

wherein the tape drive controller determines if more than a predetermined number of tracks for a given data byte are in error for each data block, wherein the tape drive controller generates a degradation signal indicative of the tape being degraded if the ratio of data blocks having more than the predetermined number of tracks for a given data byte being in error versus the total number of data blocks read from the tape is above a predetermined ratio.

7. The system of claim 6 wherein:

the tape drive controller generates a degradation signal indicative of the tape drive and the tape being degraded if the ratio of the sum of the data blocks having more than the predetermined number of data bytes along a single track being in error and the data blocks having more than the predetermined number of tracks for a given data byte being in error versus the total number of data blocks read from the tape is above a predetermined ratio.

* * * * *